United States Patent
Wang

(10) Patent No.: US 8,053,924 B2
(45) Date of Patent: Nov. 8, 2011

(54) STRUCTURE OF SERIAL SYNCHRONOUS CHOPPER

(75) Inventor: Chi-Jen Wang, Taipei County (TW)

(73) Assignee: Loong Yee Industrial Corp., Ltd., Wugu Township (TW)

( * ) Notice: Subject to any disclaimer, the term of this patent is extended or adjusted under 35 U.S.C. 154(b) by 421 days.

(21) Appl. No.: 12/465,627

(22) Filed: May 13, 2009

(65) Prior Publication Data

US 2010/0290260 A1    Nov. 18, 2010

(51) Int. Cl.
*H02J 1/00*    (2006.01)
(52) U.S. Cl. .......................................... 307/31
(58) Field of Classification Search .............. 307/31, 307/35, 36, 11
See application file for complete search history.

(56) References Cited

U.S. PATENT DOCUMENTS 4,055,790 A * 10/1977 Gerding et al. ................ 307/31
* cited by examiner

*Primary Examiner* — Shawn Riley

(57) ABSTRACT

An improved structure of serial synchronous chopper mainly includes an external synchronous rectifier power supply unit, an internal synchronous rectifier power supply unit, a synchronous voltage-stabilized control unit, an integrated driving circuit unit, a synchronous load feedback control unit, and a synchronous integrated chopping unit. While operating, the structure is serially connected to a live wire of a power supply to periodically perform synchronous chopping so as to provide a synchronous DC voltage-stabilized output as a fundamental power supply in connection with an external circuit. The structure entirely adopts a linear synchronous integral based design to greatly enhance the chopping efficiency and provide a more stable phase current reference point so that the overload protection response in a high-load operating environment is fast and secure, the loop interference and the power consumption of the chopping element can be simultaneously alleviated, the operating voltage is comparatively stable and the faulty rate is lower.

11 Claims, 11 Drawing Sheets

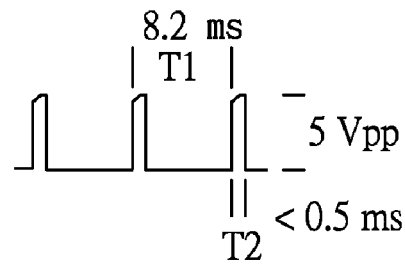
Fig.7-A
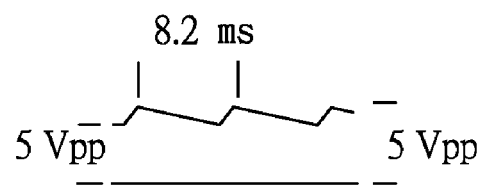
Fig.7-B
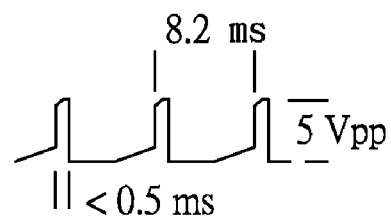
Fig.7-C
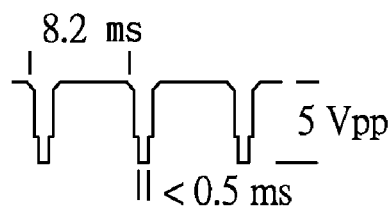
Fig.7-D

STRUCTURE OF SERIAL SYNCHRONOUS CHOPPER

FIELD OF THE INVENTION

The present invention relates to a serial synchronous chopper, and more particularly to one adopting a linear synchronous integral based design, having a good chopping efficiency and stable supply of power, and serially connected with the live wire of a power supply for performing synchronous periodic chopping, so as to provide a synchronous DC voltage-stabilized output as an fundamental power supply.

BACKGROUND OF THE INVENTION

Regular electronic appliances normally use DC power as the source of their operating power, selectively use a battery to adapt to different operating environment or condition, or use the power rectified and filtered by a mains transformer. However, as the pattern using transformer occupies more space due to its huge size involved and the use of battery always incurs the inconvenience of frequent replacement or charging circuit implementation, how to directly and effectively acquire sufficient and stable DC power by chopping the AC mains electricity becomes the topics that power supply industry endeavors to develop and break through.

As for the chopping method of the current 50 Hz/60 Hz AC mains power, there are a multitude of designs and patent cases which have been disclosed already. For example, what is shown in FIG. 1 is a more advanced conventional serial chopper structure that is mainly connected with the live wire of a power supply in series to chop the power in an integrated manner and obtain a stable low-voltage DC power after rectification and voltage stabilization. The chopper structure includes: a rectification and voltage stabilization unit 91 outputting a stabilized voltage after rectifying the integrated chopped power obtained from the live wire of the power supply to provide a low-voltage DC power to internal circuit and external circuit; a stabilized voltage control unit 92 automatically outputting an integrated pulse wave when the integrated chopped power reaches a preset value; and an integrated chopping power driving unit 93 whose input end is connected with the stabilized voltage control unit 92 to receive the integrated pulse wave, thereby controlling the integrated chopping and generating an open-circuit chopped voltage with respect to the integrated pulse wave from the live wire of the power supply.

As shown in FIG. 2 which illustrates an output waveform when operating a conventional serial AC chopper, the chopping operation in the negative half cycle is still continuous. The 'a' portion on the bottom is consumed for reactive power. Temperature rise will arise while operating in a long duration. Meanwhile, the noise and interference to power will also increase. Whereas, after a capacitor stabilizes the voltage and outputs a waveform, the 'b' portion on the top will indirectly affect the voltage variation due to a load serially connected with an output power supply. As a result of the unstable DC power supply condition and the numerous limitations of peripheral products, the electromagnetic interference (EMI) out of reactive power becomes inevitable once an inductive load is connected.

Besides, most of the conventional serial AC chopping methods currently lack of the synchronous design feature, and the chopping circuit and the operation thereof still present the following drawbacks which are further to be improved anxiously:

1. In view of the chopping method without the synchronous design feature, the DC portion of the chopping output will always impact on the operational control of the subsequent connected MCU (Microcontroller Unit) to result in an abnormal operation.

2. As most of the chopping designs have no synchronous chopping development, the conversion efficiency fails to be upgraded so that a lengthy operation of the chopping components will give rise to the phenomenon of temperature rise.

3. As the operation pattern having a serial-connected load is adopted, given no good synchronous control, the 50 Hz/60 Hz serial AC chopping is usually subject to surrounding static interference and causes a resulting malfunction. This simply adds more determination conditions to the MCU, which lead to lots of inconvenience arising from heavier operational load and slower response time in operation.

4. Owing to no synchronous function, in the course of the AC chopping, phase will vary with the serial-connected load, such that a current reference point cannot be precisely set up. Therefore, when operating under a heavy load, the over-load protection fails to be brought into play and this issue becomes even more serious when connected with an inductive load.

SUMMARY OF THE INVENTION

In view of the foregoing concern, a main aspect of the present invention is to provide an improved structure of serial synchronous chopper. The improved structure of serial synchronous chopper mainly includes: an external synchronous rectifier power supply unit, an internal synchronous rectifier power supply unit, a synchronous voltage-stabilized control unit, an integrated driving circuit unit, a synchronous load feedback control unit, and a synchronous integrated chopping unit; and characterized by:

the external synchronous rectifier power supply unit having one side connected with an input end of a live wire of a power supply and having another side equipped with a DC voltage-stabilized output end;

the internal synchronous rectifier power supply unit having one side in connection with the input end of the live wire of the power supply and having another side equipped with a first branch in connection with the synchronous load feedback control unit and the synchronous voltage-stabilized control unit and a second branch in connection with the integrated driving circuit unit, the synchronous integrated chopping unit and another side of the synchronous load feedback control unit.

the integrated driving circuit unit having one side connected with the second branch of the internal synchronous rectifier power supply unit and the synchronous integrated chopping unit to control the synchronous integrated chopping unit, and having another side connected with the synchronous voltage-stabilized control unit to be controlled thereby; and the synchronous integrated chopping unit connected with and controlled by the integrated driving circuit unit, having one side connected to the input end of the live wire of the power supply and another side equipped with an output end of the live wire of the power supply, and having a synchronous sampling terminal for chopping to control the synchronous load feedback control unit and the synchronous voltage-stabilized control unit;

whereby the improved structure of serial synchronous chopper is serially connected to the live wire of the power supply to periodically perform synchronous chopping so as to provide a synchronous DC voltage-stabilized output as a fundamental power supply to a connected external circuit.

The foregoing and other features and advantages of the present invention will be more clearly understood through the following descriptions with reference to the drawing, wherein:

BRIEF DESCRIPTION OF THE DRAWINGS

FIG. 7-A is a waveform diagram at a node A in accordance with the present invention;

FIG. 7-B is a waveform diagram at a node B in accordance with the present invention;

FIG. 7-C is a waveform diagram at a node C in accordance with the present invention;

FIG. 7-D is a waveform diagram at a node D in accordance with the present invention;

DETAILED DESCRIPTION OF THE PREFERRED EMBODIMENT

It is to be noted that the following descriptions of preferred embodiments of this invention are presented herein for purpose of illustration and description only; it is not intended to be exhaustive or to be limited to the precise form disclosed.

The present invention will now be described more specifically with reference to the following embodiments.

Figure 1:
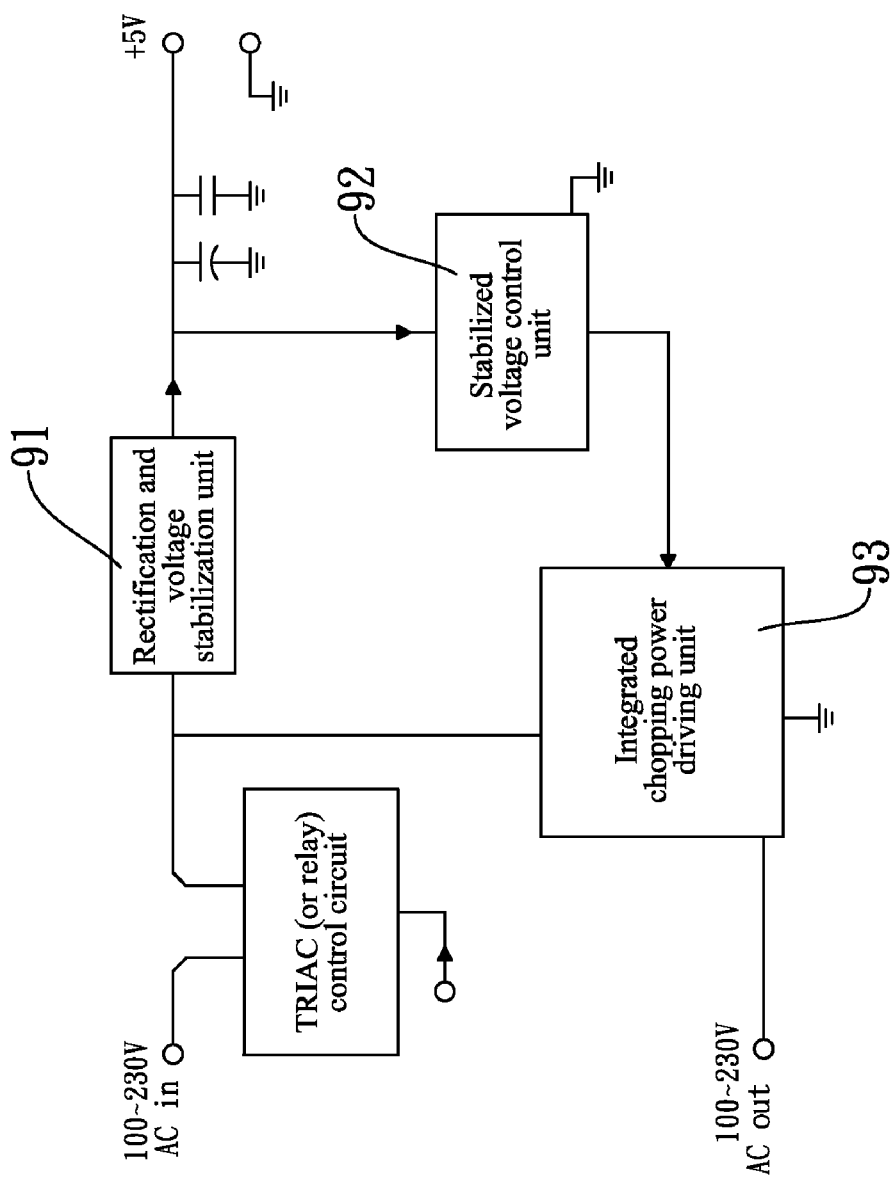
FIG. 1 is a block diagram of a conventional serial chopper.
Figure 2:
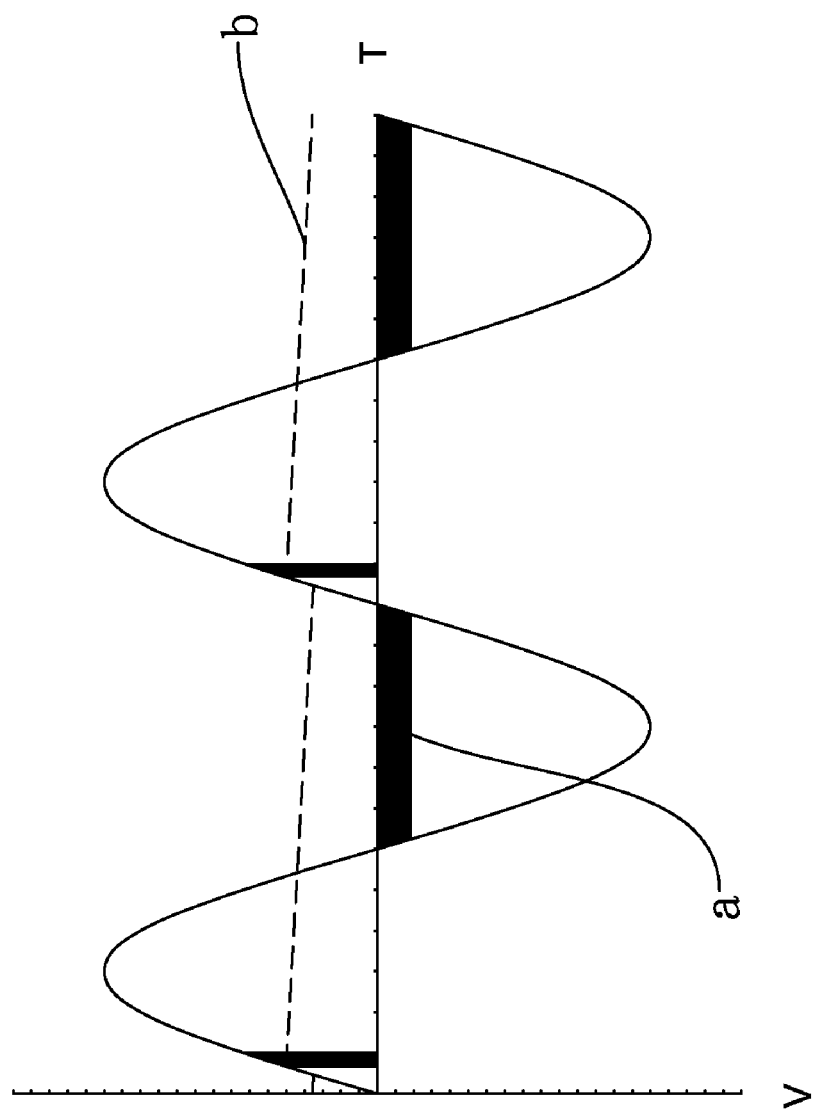
FIG. 2 is an operational waveform diagram of the conventional serial chopper.
Figure 3:
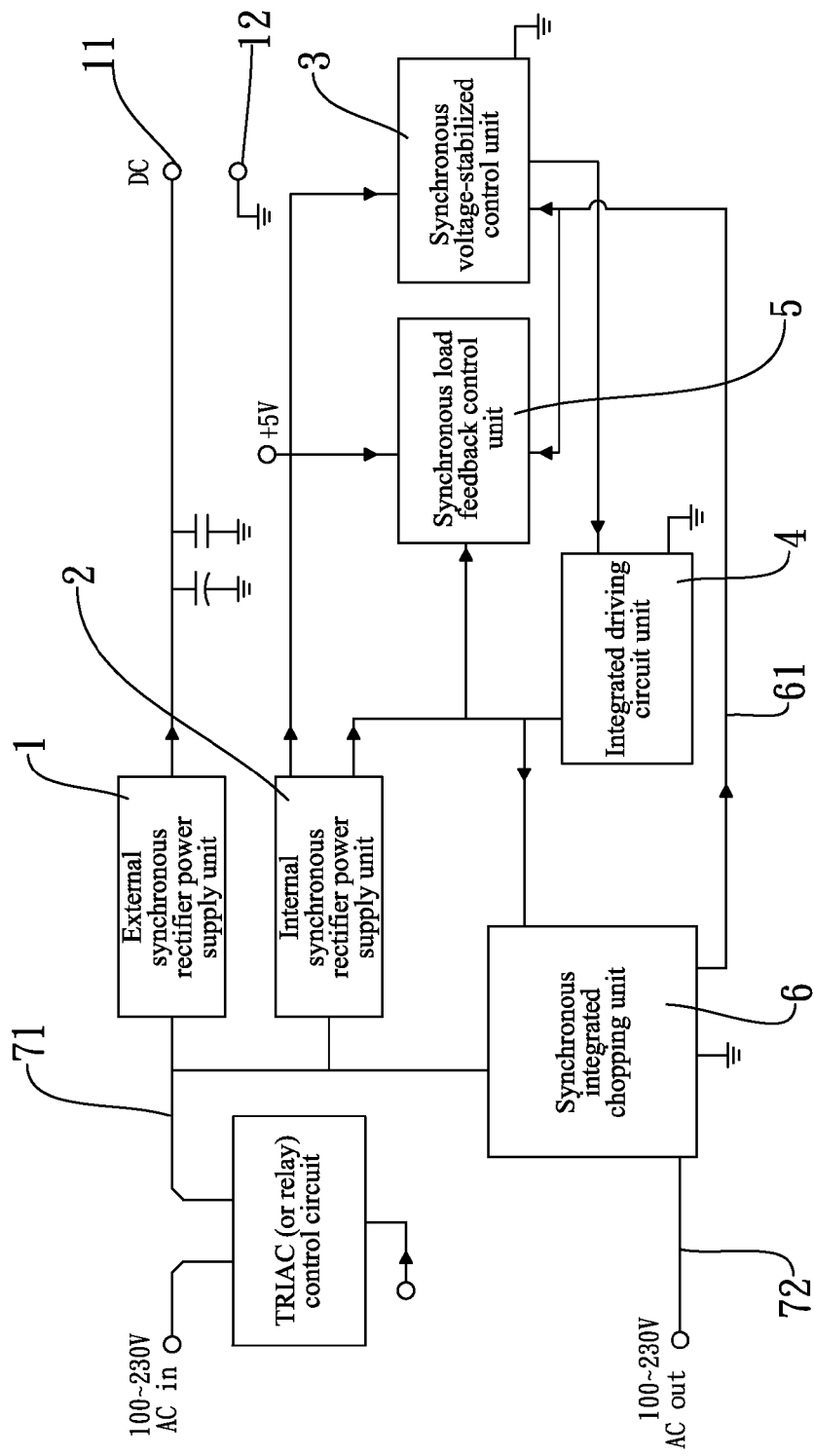
FIG. 3 is a block diagram of a serial synchronous chopper in accordance with the present invention.
Figure 4:
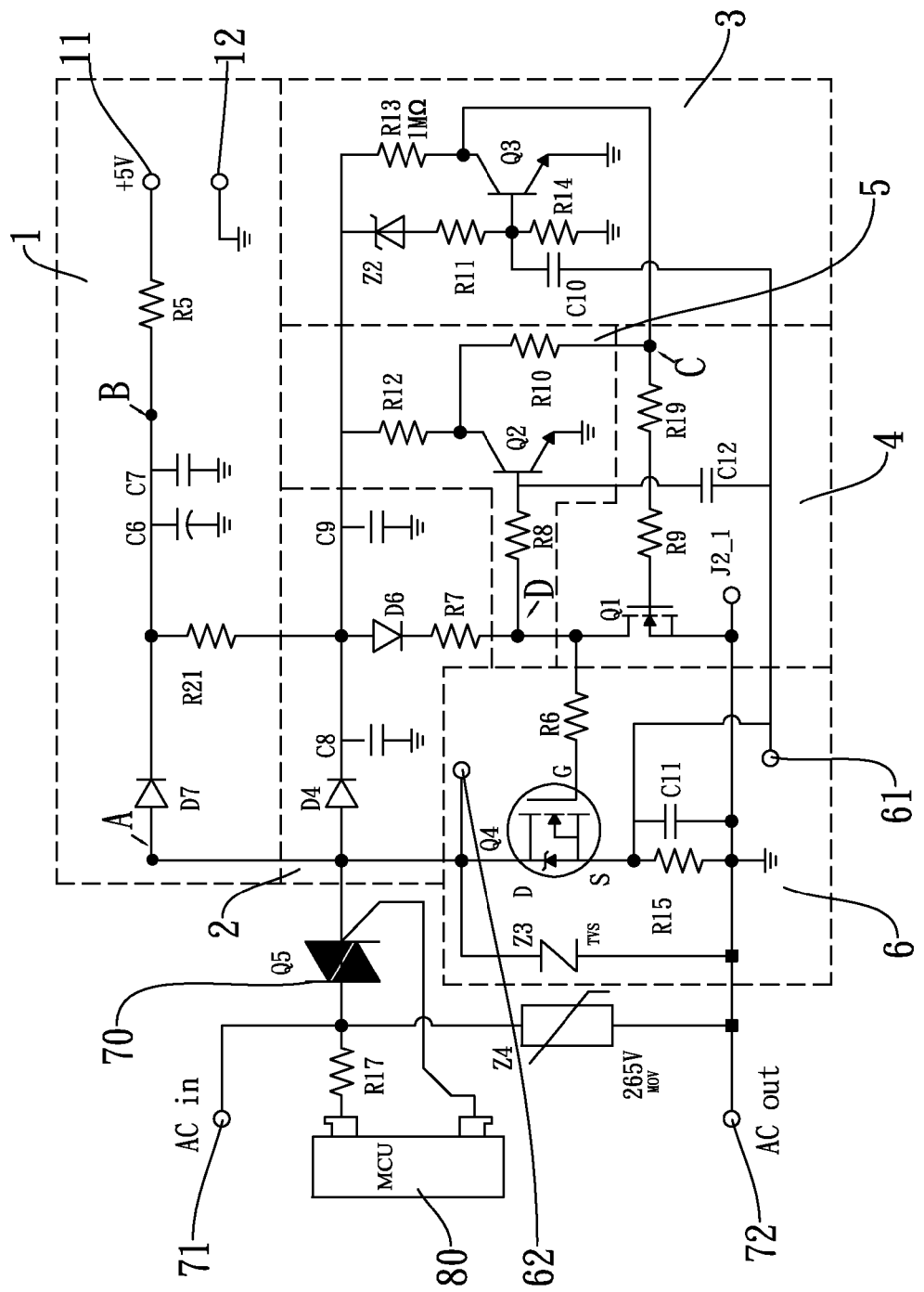
FIG. 4 is a circuit diagram of the serial synchronous chopper in accordance with the present invention.

With reference to FIG. 3 and FIG. 4, an improved serial synchronous chopper structure in accordance with the present invention mainly includes: an external synchronous rectifier power supply unit 1, an internal synchronous rectifier power supply unit 2, a synchronous voltage-stabilized control unit 3, an integrated driving circuit unit 4, a synchronous load feedback control unit 5, and a synchronous integrated chopping unit 6. Please refer to FIG. 3 for the earlier part of the following description in association with the linking relationship among all units, and refer to FIG. 4 for the later part in association with the detailed composition all the components of all units.

The external synchronous rectifier power supply unit 1 has one side connected with an input end 71 of a live wire of a power supply and another side equipped with a DC voltage-stabilized output end 11. The external power supply unit 1 further contains a rectifier diode D7, two parallel-connected capacitors C6 and C7 and a serial-connected protection resistor R5 in sequence.

The internal synchronous rectifier power supply unit 2 has one side connected with the input end 71 of the live wire of the power supply, and another side equipped with a first branch in connection with the synchronous load feedback control unit 5 and the synchronous voltage-stabilized control unit 3, and a second branch in connection with the integrated driving circuit unit 4, the synchronous integrated chopping unit 6 and another side of the synchronous load feedback control unit 5. The internal synchronous rectifier power supply unit 2 further sequentially contains a rectifier diode D4, two parallel-connected capacitors C8 and C9, and a diode D6 and a resistor R7 connected in series. The internal synchronous rectifier power supply unit 2 and the external synchronous rectifier power supply unit 1 are connected with a resistor R21.

The synchronous voltage-stabilized control unit 3 is a zener voltage-stabilized switching control circuit, which has an NPN transistor Q3, a bias resistor R13 connected to the collector, two voltage divider resistors R11 and R14 connected to the base, and a zener diode Z2 is serially connected with the internal synchronous rectifier power supply unit 2 and the voltage divider resistor R11.

The synchronous load feedback control unit 5 is a switching transistor control circuit having a NPN transistor Q2, two bias resistors R8 and R12 connected to the base and the collector respectively, and an output resistor R10 connected in parallel to the collector.

The integrated driving circuit unit 4 has one side connected with the second branch of the internal synchronous rectifier power supply unit 2 to connect with and control the synchronous integrated chopping unit 6, and has another side connected with the synchronous voltage-stabilized control unit 3 to be controlled thereby. The integrated driving circuit unit 4 contains a FET Q1 and two resistors serially connected to the gate.

The synchronous integrated chopping unit 6 is controlled through the integrated driving circuit unit 4. One side thereof is connected with the input end 71 of the live wire of the power supply, and another side has an output end 72 of the live wire of the power supply. The synchronous integrated chopping unit 6 has a synchronous sampling terminal for chopping 61 to control the synchronous load feedback control unit 5 and the synchronous voltage-stabilized control unit 3. The synchronous integrated chopping unit 6 contains a low-resistance, high-current and large-power FET Q4 whose drain is connected to the input end 71 of the live wire of the power supply, an input resistor R6 serially mounted on the gate, a resistor R15 and a capacitor C11 mounted in parallel between the source and the output end 72 of the live wire of the power supply, and a surge absorber Z3 mounted between the drain and the source.

Figure 5:
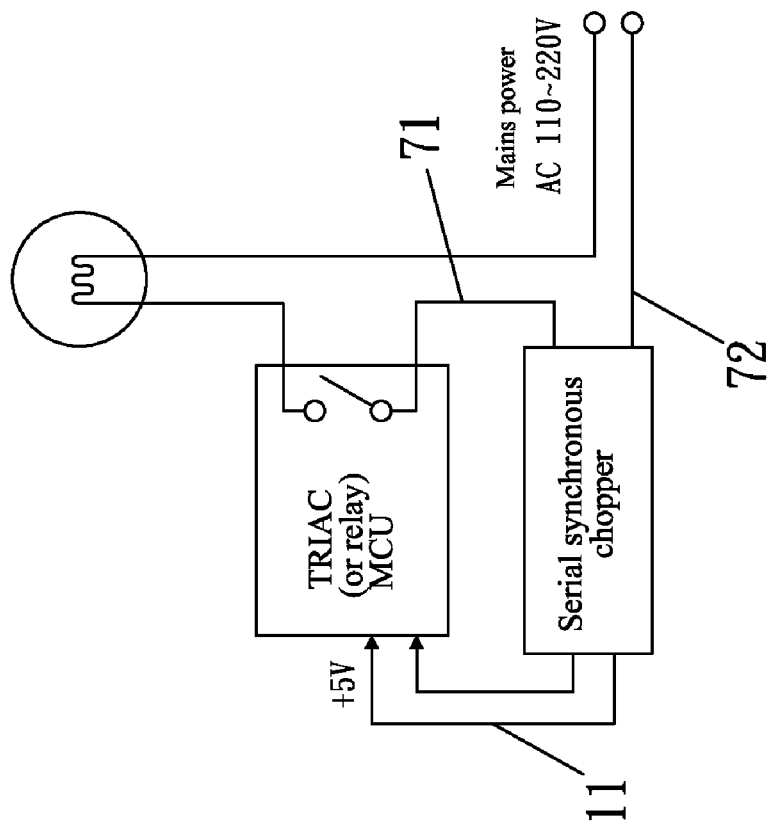
FIG. 5 is a schematic view of the present invention applied to AC chopping.
Figure 6:
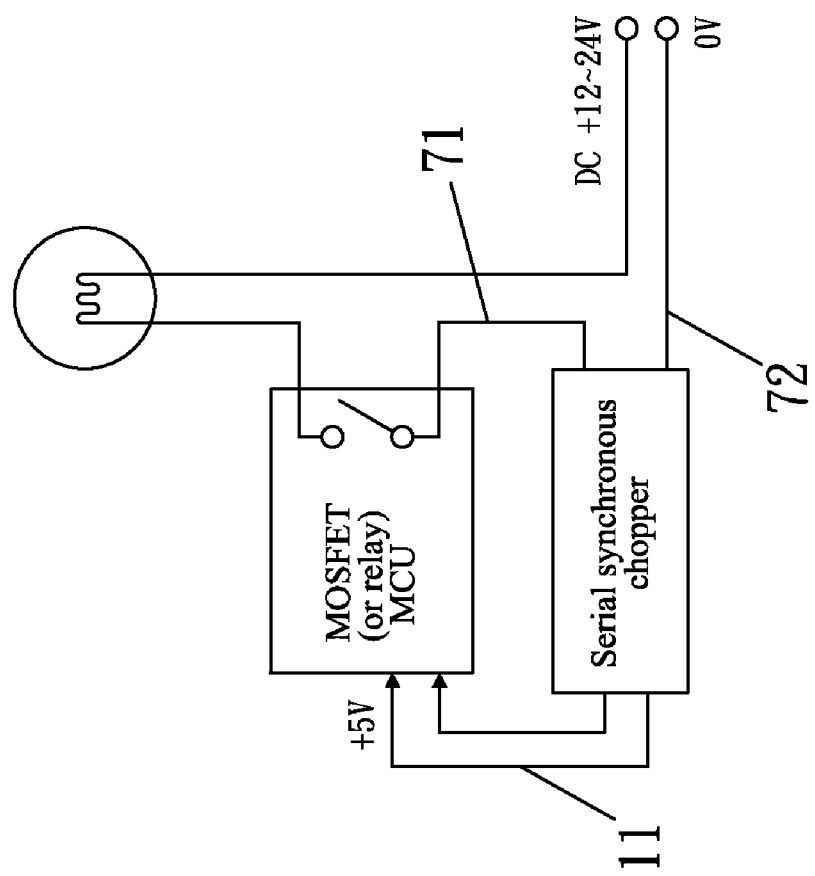
FIG. 6 is a schematic view of the present invention applied to DC chopping.

As a result, the combined structure can be applied to general AC mains power as shown in FIG. 5, or can be applied to general DC power as shown in FIG. 6, such that the structure is serially connected to the live wire of the power supply to periodically perform synchronous chopping to provide a synchronous DC voltage-stabilized output as a fundamental power supply of connected external circuit.

With reference to FIG. 3-5, given the example of obtaining a 5V DC voltage-stabilized operation by chopping the 110V AC mains power, an input end of the AC power is serially connected to the input end 71 of the live wire of the power supply through a TRIAC transistor 70 (or relay), further to the high-power FET Q4 of the synchronous integrated chopping unit 6, and then to the load through the output end 72 of the live wire of the power.

When the high-power FET Q4 performs chopping, the integrated pulse wave generated at the node A is shown in FIG. 7-A to generate the waveform at node B as shown in FIG. 7-B through the external synchronous rectifier power supply unit 1 so as to supply power to a MCU 80 of an external circuit from the DC voltage-stabilized output end 11. Besides, the generated integrated pulse wave also supplies the power required by the internal integral circuit by using the internal synchronous rectifier power supply unit 2 to output a stable voltage.

The synchronous voltage-stabilized control unit 3 has a zener diode Z2 therein to control voltage. When the integrated chopped power reaches a preset value, e.g. 3V, 5V or 12V, an integrated pulse wave is automatically generated to output a waveform at node C as shown in FIG. 7-C. The waveform at node C is connected to an input end of the integrated driving circuit unit 4 to rectify and amplify the integrated pulse wave and then output it to drive the high-power FET Q4 of the synchronous integrated chopping unit 6 so as to control the integrated chopping in accordance with the waveform. Therefore, the synchronous integrated chopping unit 6 supplies power through the TRIAC transistor 70 (or relay) to generate an open-circuit chopped voltage with respect to the integrated pulse wave as shown in FIG. 7-A.

After performing chopping, the synchronous integrated chopping unit 6 simultaneously outputs a feedback signal, which is transmitted back to the synchronous load feedback control unit 5 and the synchronous voltage-stabilized control unit 3 through the synchronous sampling terminal for chopping 61 to lock the phase difference variation of the power supply and enhance the stability of the chopping operation. Moreover, when the synchronous integrated chopping unit 6 finishes chopping, the high-power FET Q still stays at a low-resistance conducting state. Hence, the input loss of the serial-connected AC power is relatively small.

In fact, throughout the whole chopping process, the synchronous load feedback control unit 5 plays a rather important role, which can make a timely adjustment of the integrated power to maintain a good voltage-stabilized state in accordance with the minor phase difference variation obtained from the connected integrated driving circuit unit 4 and the node D.

For the chopping node A (as shown in the FIG. 7-A) in the external synchronous rectifier power supply unit 1 of the present invention, the optimal unit time T1 of chopping can be limited in a range of 8.3 ms~20 ms, the effective integrated pulse T2 is limited in a range of 0.2 ms~1 ms, the amplitude of wave Vpp is limited in a range of 3~15V, the voltage supplied by the DC voltage-stabilized end 11 is limited in a range of DC 3~15V, and the applied power is limited in a range of 3~800 W.

The fabricated circuit can always operate normally regardless of forward or reverse wiring so that the connection to wrong electrode won't damage component at all. Furthermore, the phase current reference point is comparatively much more stable. In a high-load operating environment, the overload protection responds rapidly and firmly, not only alleviating the power loss of the chopping element, providing a relatively stable operating voltage and reducing the faulty rate, but also lowering the loop interference. When connected with an inductive load, the operating stability of the present invention is comparable favorably with or even surpasses that of the conventional chopping standard.

Figure 8:
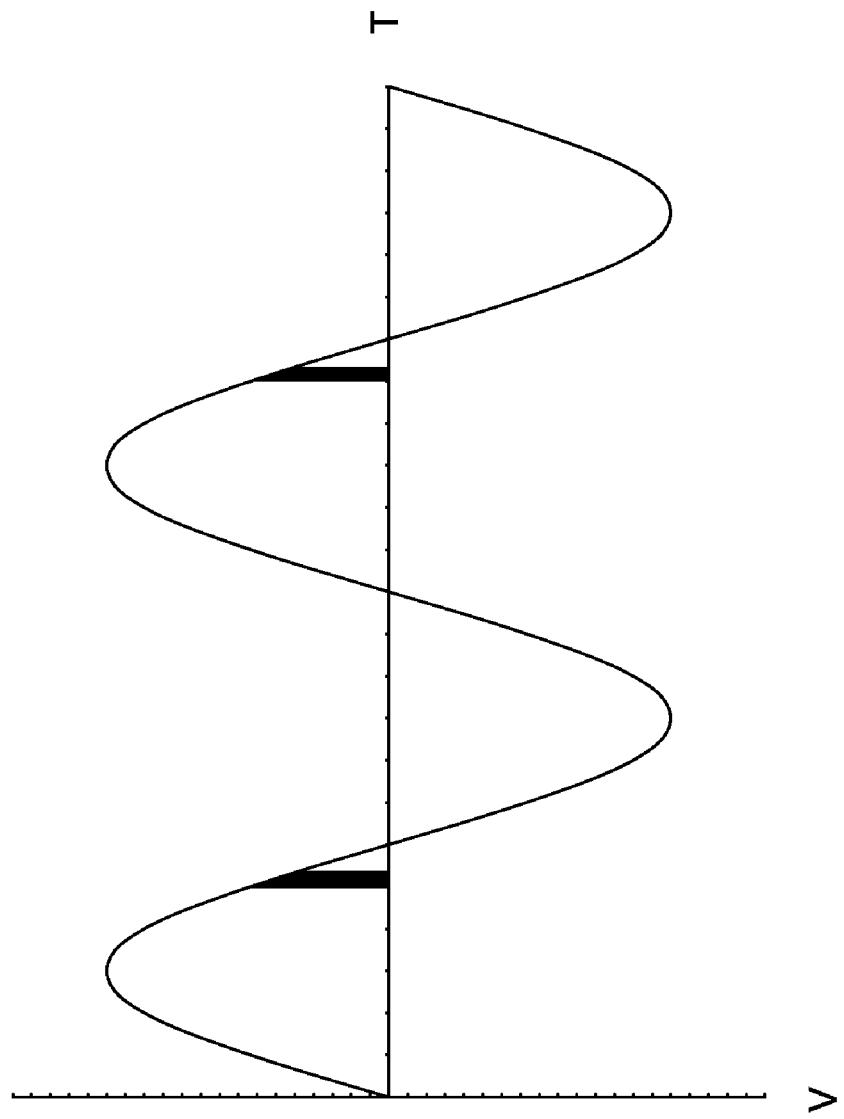
FIG. 8 is a waveform diagram illustrating the chopping operation of the serial synchronous chopper in accordance with the present invention.

With reference to FIG. 8, the present invention employs the linear synchronous integral based design. For sake of accurately controlling chopping in the descending part only, the reactive power consumed in the bottom portion of the negative half cycle can be improved and the chopping efficiency is 50% higher than that of conventional chopping efficiency. Meanwhile, the power consumption of the chopping element can be reduced, the temperature rise arising from long operation duration is obviously alleviated, and the power noise interference is relatively improved a lot.

Figure 9:
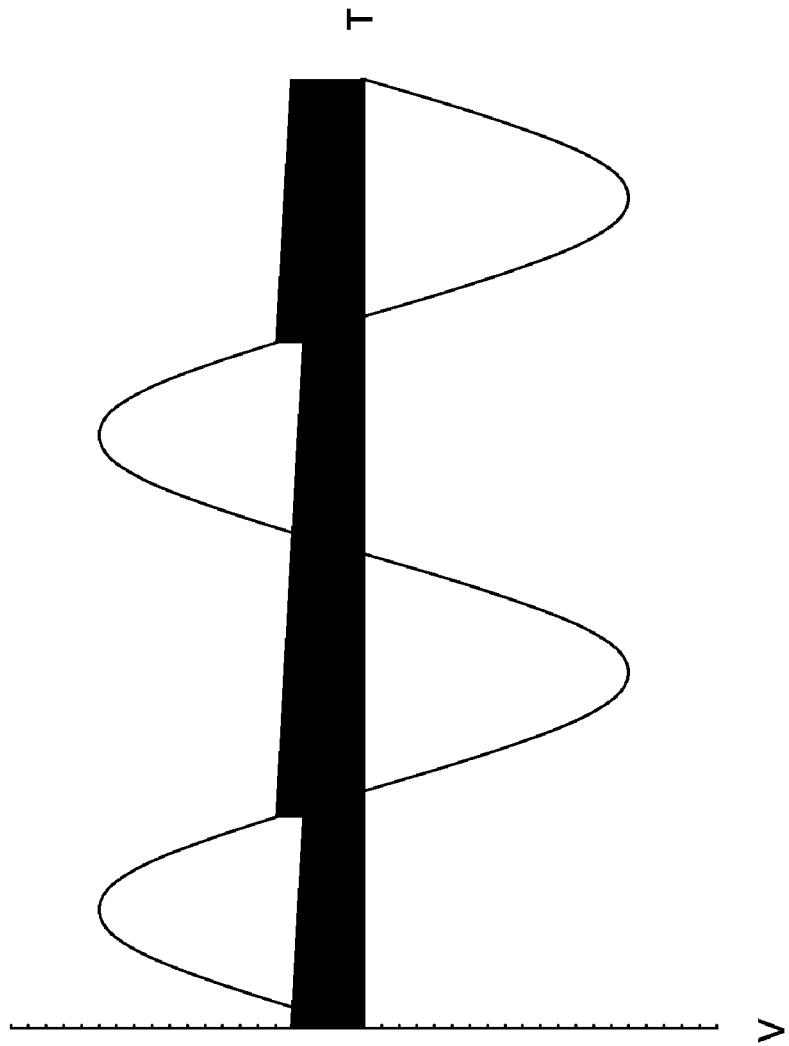
FIG. 9 is a waveform illustrating the stabilized voltage output of the serial synchronous chopper in accordance with the present invention.

With reference to FIG. 9 illustrating an output waveform after stabilizing the chopped voltage with a capacitor, the output power won't be affected upon varying the serial-connected load. Therefore, the output condition of DC power is stable, more peripheral products and applications can be supported, different load in connection is acceptable, and the FCC EMI electromagnetic interference certification is approved.

Figure 10:
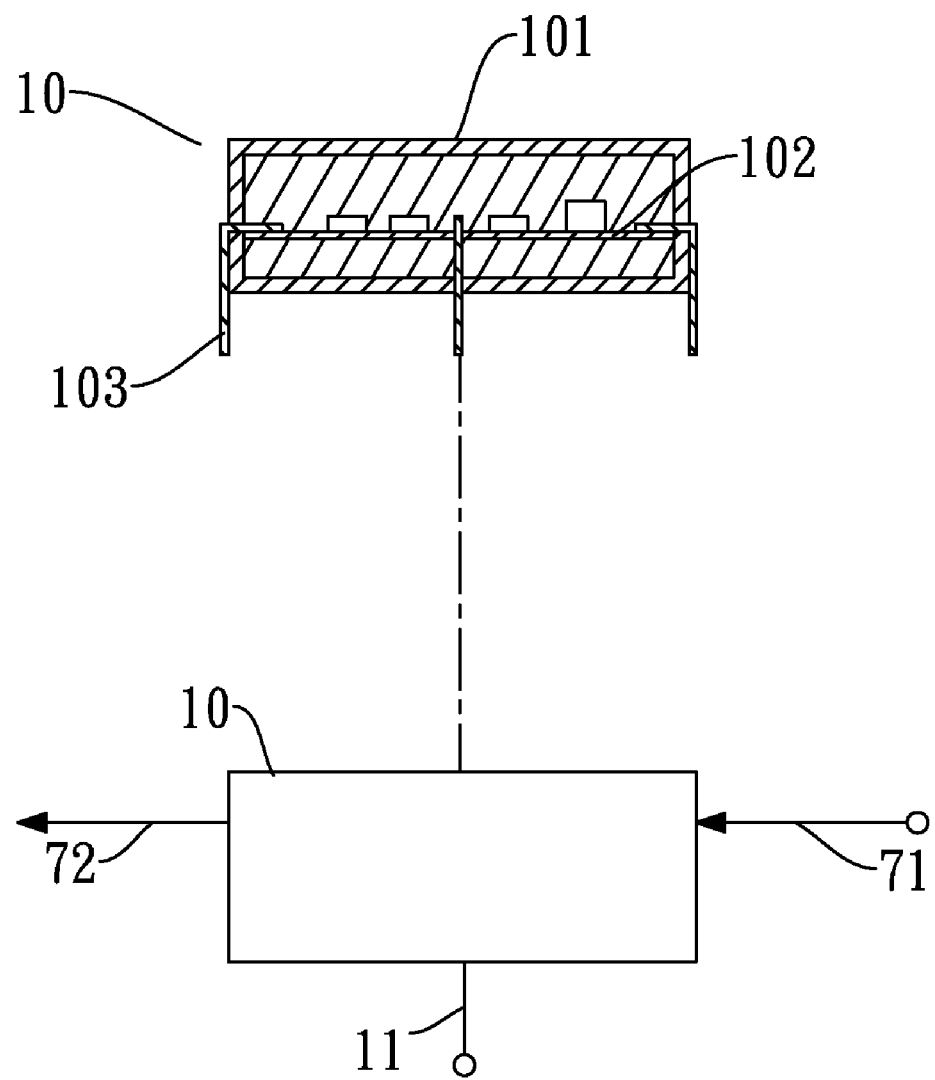
FIG. 10 is a schematic view of a standalone chopper module built in accordance with the present invention.
Figure 11:
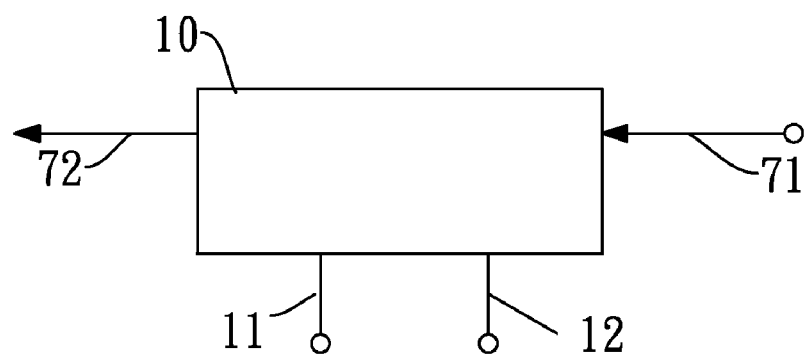
FIG. 11 is a schematic view of the chopper module additionally equipped with a ground pin in accordance with the present invention.
Figure 12:
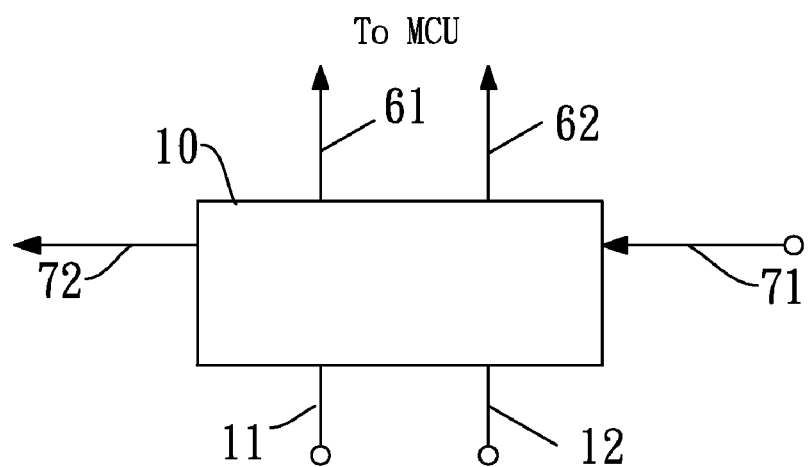
FIG. 12 is a schematic view of the chopper module additionally equipped with other control pins in accordance with the present invention.

With reference to FIG. 10, to conveniently match up the use with various different electronic products, the circuit provided by the present invention can be fabricated as an IC chip (not shown) or a chopper module 10 in a standalone pattern. The structure thereof has a package casing 101 externally, a circuit board 102 therein and a plurality of pins 103. Essentially, the structure at least contains an input pin 71 of a live wire of a power supply, an output pin 72 of the live wire of the power supply and a DC voltage-stabilized output pin 11. An optional ground pin 12 expanded in accordance with the different specifications as shown in FIG. 4 and FIG. 11 or a synchronous sampling pin for chopping 61 mounted as shown in FIG. 4 and FIG. 12 and a synchronous signal output pin 62 are added to connect with different external circuit.

Adopting the serial chopping in accordance with the present invention can provide AC/DC dual-purpose synchronous chopping operation and expand the application scope of circuits. Besides, the occasions applicable to its equipment and the advantages are as follows:

While applying to a public place, the present invention replaces the traditional power distribution method, makes construction easy and lowers the duct and wiring cost. The present invention works normally regardless of forward or reverse connection without damaging the component due to the connection to wrong electrode.

While providing to a company, factory, hospital and disease control center or the power supply solution of RFID peripheral component, the present invention reduces the battery demand, and in the meantime saves the battery cost and the battery scrap pollution recycling scheme.

While applying to a high-efficient AC chopping conversion, the present invention provides a power supply solution to a monitoring and control system and a closed-type explosion-proof function to make it applicable to a highly hazardous zone such as fuel depot, fuel storage tank, petroleum refinery and so forth.

While applying to regular presidential area, the present invention provides an embedded switch inside a wall for supplying power to lighting system, making power distribution system more flexible.

While using AC chopping to provide a stable DC power output, the present invention requires no additional transformer and battery and thus lowers the maintenance cost and achieve the requirement of cost saving and lower environmental pollution.

Likewise, by virtue of the nature of stable serial chopping reference, the present invention is also applicable to a DC monitoring and control system, e.g. electric car, uninterruptible power system (UPS), battery load management part of solar panel and other monitoring gauge and equipment requiring DC power. As such, the present invention can directly replace the power supply element of expensive DC-DC converter, lower the chance of EMI occurrence and enable a stable operation even though an inductive load is connected.

In sum, the present invention provides the practical and innovative value to the industry and the application is hereby submitted in accordance with the patent laws.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. An improved structure of serial synchronous chopper, mainly comprising:
    an external synchronous rectifier power supply unit, an internal synchronous rectifier power supply unit, a synchronous voltage-stabilized control unit, an integrated driving circuit unit, a synchronous load feedback control unit, and a synchronous integrated chopping unit; and characterized by:
    the external synchronous rectifier power supply unit having one side connected with an input end of a live wire of a power supply and having another side equipped with a DC voltage-stabilized output end;
    the internal synchronous rectifier power supply unit having one side in connection with the input end of the live wire of the power supply and having another side equipped with a first branch in connection with the synchronous load feedback control unit and the synchronous voltage-stabilized control unit and a second branch in connection with the integrated driving circuit unit, the synchronous integrated chopping unit and another side of the synchronous load feedback control unit;
    the integrated driving circuit unit having one side connected with the second branch of the internal synchronous rectifier power supply unit and the synchronous integrated chopping unit to control the synchronous integrated chopping unit, and having another side connected with the synchronous voltage-stabilized control unit to be controlled thereby; and
    the synchronous integrated chopping unit connected with and controlled by the integrated driving circuit unit, having one side connected to the input end of the live wire of the power supply and another side equipped with an output end of the live wire of the power supply, and having a synchronous sampling terminal for chopping to control the synchronous load feedback control unit and the synchronous voltage-stabilized control unit;
    whereby the improved structure of serial synchronous chopper is serially connected to the live wire of the power supply to periodically perform synchronous chopping so as to provide a synchronous DC voltage-stabilized output as a fundamental power supply to a connected external circuit.

2. The improved structure of serial synchronous chopper as claimed in claim 1, wherein the external synchronous rectifier power supply unit further comprises a rectifier diode, two parallel-connected capacitors and a serial-connected protection resistor in sequence; the internal synchronous rectifier power supply unit further comprises a rectifier diode, two parallel-connected capacitors and a serial-connected resistor, the synchronous voltage-stabilized control unit is a zener voltage-stabilized switching control circuit having an NPN transistor, a bias resistor connected to a collector thereof, a first and a second voltage divider resistors connected to a base thereof respectively, and a zener diode serially connected with the internal synchronous rectifier power supply unit and the voltage divider resistor; the integrated driving circuit unit 4 further comprises a field effect transistor and two resistors serially connected to a gate thereof respectively; the synchronous load feedback control unit is a switching transistor control circuit having a NPN transistor, two bias resistors connected to a base and a collector thereof respectively, and an output resistor connected in parallel to the collector thereof; the synchronous integrated chopping unit further comprises a low-resistance, high-current and large-power FET having a drain connected to the input end of the live wire of the power supply, an input resistor serially mounted on a gate thereof, a resistor and a capacitor mounted in parallel between a source thereof and the output end of the live wire of the power supply, and a surge absorber mounted between a drain and a source thereof.

3. The improved structure of serial synchronous chopper as claimed in claim 2, wherein the external synchronous rectifier power supply unit and the internal synchronous rectifier power supply unit are connected with a resistor therebetween, a supply voltage supplied by the DC voltage-stabilized output end of the external synchronous rectifier power supply unit is limited in a range of DC 3 to 15V, and an applied power thereof is limited in a range of 3 to 800 W.

4. The improved structure of serial synchronous chopper as claimed in claim 2, wherein an optimal unit time T1 of chopping at a chopping node of the external synchronous rectifier power supply unit is limited in a range of 8.3 ms to 20 ms, an effective integrated pulse T2 is limited in a range of 0.2 ms to 1 ms, and an amplitude of wave Vpp is limited in a range of 3 to 15V.

5. The improved structure of serial synchronous chopper as claimed in claim 2, wherein the input end of the live wire of the power supply is connected to a DC power supply externally.

6. The improved structure of serial synchronous chopper as claimed in claim 2, wherein the input end of the live wire of the power supply is connected to an AC power supply externally.

7. The improved structure of serial synchronous chopper as claimed in claim 6 having an AC power chopping position located at a descending part of a positive half cycle.

8. The improved structure of serial synchronous chopper as claimed in claim 2 entirely fabricated as an integrated circuit.

9. The improved structure of serial synchronous chopper as claimed in claim 2 entirely fabricated as a chopper module.

10. The improved structure of serial synchronous chopper as claimed in claim 9, wherein the chopper module has a package casing externally, a circuit board therein and a plurality of pins with at least an input pin of the live wire of the power supply, an output pin of the live wire of the power supply and a low-voltage DC voltage-stabilized output pin.

11. The improved structure of serial synchronous chopper as claimed in claim 10, wherein the chopper module further comprises one of an overload protection signal output pin, a synchronous signal output pin and a ground pin additionally mounted thereon.

* * * * *